United States Patent

Kaneko

[11] Patent Number: 5,503,345
[45] Date of Patent: Apr. 2, 1996

[54] FISHING REEL

[75] Inventor: Kyoichi Kaneko, Tokyo, Japan

[73] Assignee: Daiwa Seiko, Inc., Tokyo, Japan

[21] Appl. No.: 154,474

[22] Filed: Nov. 19, 1993

[30] Foreign Application Priority Data

Nov. 20, 1992 [JP] Japan .................. 4-086346 U

[51] Int. Cl.⁶ .................................................. A01K 89/015
[52] U.S. Cl. .............................................. 242/279; 242/310
[58] Field of Search ................................ 242/279, 280, 242/281, 310, 312, 313, 314, 315

[56] References Cited

U.S. PATENT DOCUMENTS

| | | | |
|---|---|---|---|
| 1,554,132 | 9/1925 | Schmid | 242/279 |
| 1,674,744 | 6/1928 | Shakespeare | 242/279 |
| 1,964,965 | 7/1934 | Smelser | 242/279 |
| 2,201,476 | 5/1940 | Catucci | 242/279 |
| 2,305,533 | 12/1942 | Khoenle | 242/279 |
| 5,249,760 | 10/1993 | Morimoto | 242/279 |

FOREIGN PATENT DOCUMENTS 52-35916  8/1977  Japan.
61-12373  1/1986  Japan.

*Primary Examiner*—Joseph J. Hail, III
*Attorney, Agent, or Firm*—Longacre & White

[57] ABSTRACT

In a fishing reel, a cam shaft rotatable in conjunction with handle rotation is located in front of a spool rotatably supported by side frames, a slider having an engagement member engageable with a cam groove of the cam shaft is movably mounted on the cam shaft, and a line guide portion is provided below the cam shaft. A finger rest member is provided over the slider between the side frames so that the slider is located in the vicinity of the finger rest member. A fishline delivered from the spool is protruded forwardly through the line guide portion which is disposed below the cam shaft. The cam shaft is free from sea water, moisture, dust and so on which is removed from the fishline drawn on the line guide portion. Further, the reel can be grasped securely and stably.

16 Claims, 5 Drawing Sheets

1

FISHING REEL

BACKGROUND OF THE INVENTION

1. Field of the Invention

The present invention relates to a fishing reel in which a disposition of a slider, which is transversely driven by a cam shaft, is improved.

2. Description of the Prior Art

As disclosed in Japanese Utility Model Publication No. Sho. 61-12373, there is known a fishing reel including a finger rest member located above and in front of a spool between the side frames for improving the reel grasping ability, and a level-wind device for uniformly winding a fishline onto the spool.

In this type of the reel, a slider of the level-wind device is moved by a transverse cam shaft provided between the side frames, and a fishline guide portion is provided on the slider to be directed upwardly therefrom. Accordingly, sea water, moisture, dust and so forth are likely to be adhered onto the transverse cam shaft disposed below the fishline guide portion since the fishline onto which sea water, moisture, dust and so forth are adhered is drawn on the fishline guide portion. Thus, the fishing reel suffers from problems in that the level-wind device is deteriorated in operation to hinder the rotative winding performance, and is insufficient in anti-corrosion property since corrosion is likely to occur on a cam grove and an engagement pin of the transverse cam shaft.

Japanese Utility Model Publication No. Sho. 52-35916 discloses another type of a fishing reel in which a transverse cam shaft is disposed just above a spool between side frames, and a fishline guide portion is provided forwardly and downwardly of the transverse cam shaft. This reel requires a sufficient height to thereby deteriorate comfortability in grasping the reel or to make it impossible to grasp the reel with fingers. Further, the level-wind device itself is also made large in size.

SUMMARY OF THE INVENTION

The present invention was made in order to solve the problems found in the prior art. Accordingly, a primary objective of the invention is to provide a fishing reel in which a transverse cam shaft is free from the adverse effect due to sea water, moisture, dust and so forth removed from a fishline drawn on a fishline guide portion, and which can be grasped surely, stably and comfortably by a user.

In order to attain the above-noted and other objectives, the present invention provides a fishing reel in which a spool is rotatably supported by a pair of side frames, the side frames defining a first direction and a second direction substantially perpendicular to the first direction in a plane orthogonal to a first rotational axis of the spool. The fishing reel includes: a cam shaft supported by the side frames so as to be located forwardly of the spool in the first direction and rotatable about a second rotational axis in conjunction with rotation of the spool, the cam shaft having a cam groove; a slider movably mounted on the cam shaft and located between the side frames, the slider having an engagement follower member engageable with the cam groove; a line-guide portion through which a fishline extending from the spool substantially in the first direction passes, the line-guide portion extending from the slider so as to be located below the cam shaft in the second direction; and a finger rest member located over the slider, the finger rest member having a first end and a second end closer than the first end to the first rotational axis in the first direction. The second rotational axis is located between the first and second ends in the second direction.

DETAILED DESCRIPTION OF THE PREFERRED EMBODIMENTS

Preferred embodiments of the present invention will now be described in detail with reference to the accompanying drawings attached hereto.

Figure 1:
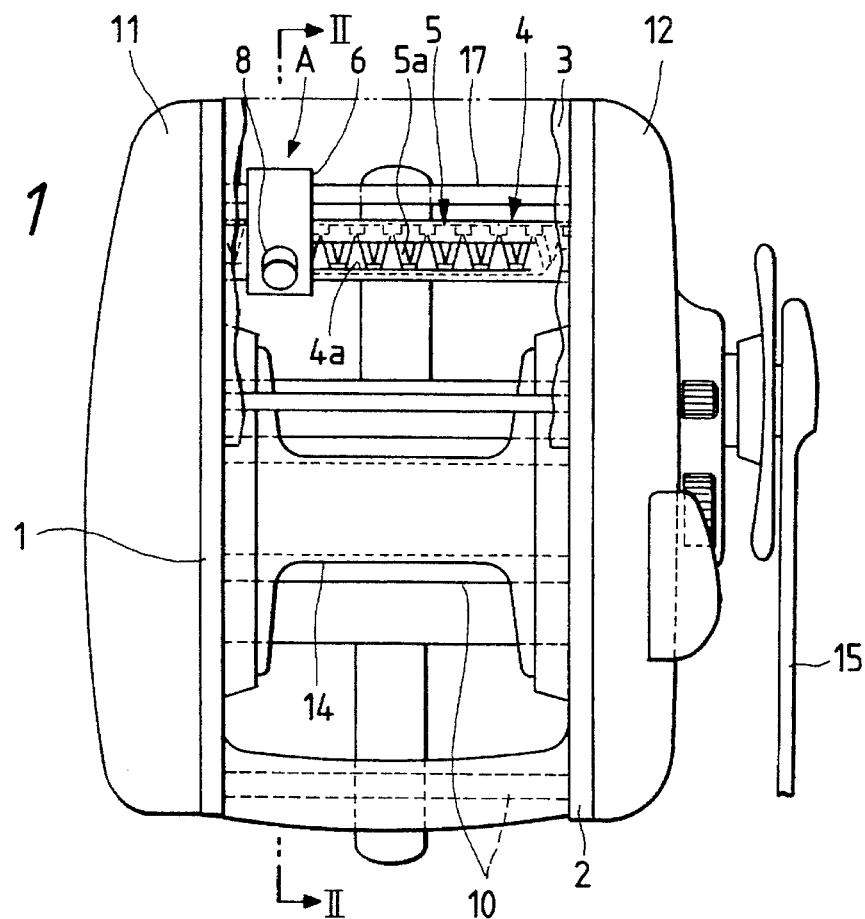
FIG. 1 is a plane view showing a double bearing type fishing reel according to a first embodiment of the present invention.
Figure 2A:
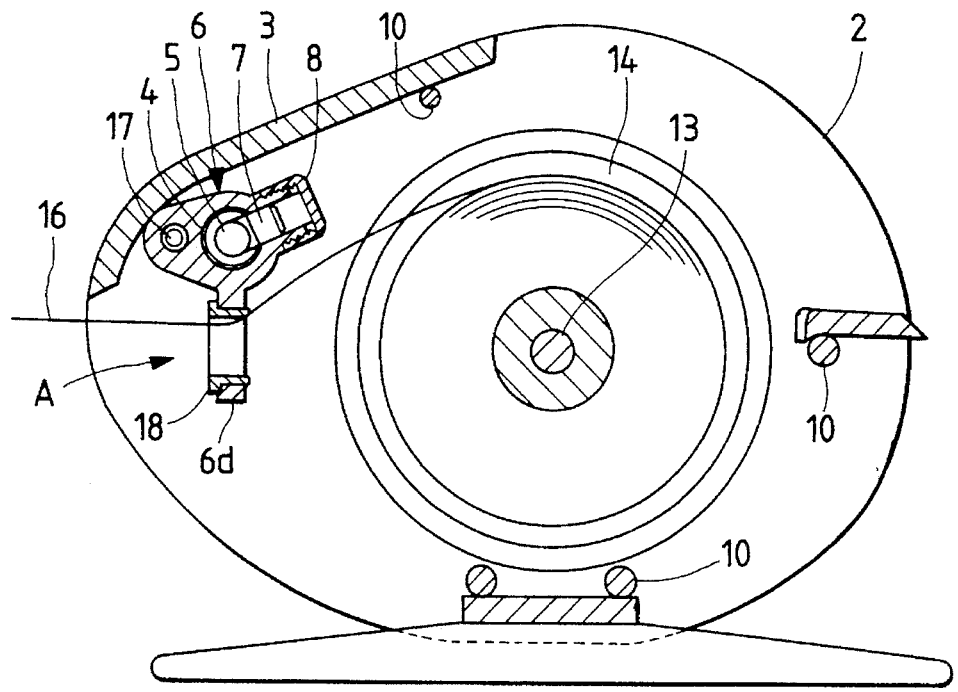
FIG. 2A is a sectional side view showing major parts of the double bearing type fishing reel taken along line II—II of FIG. 1.
Figure 2B:
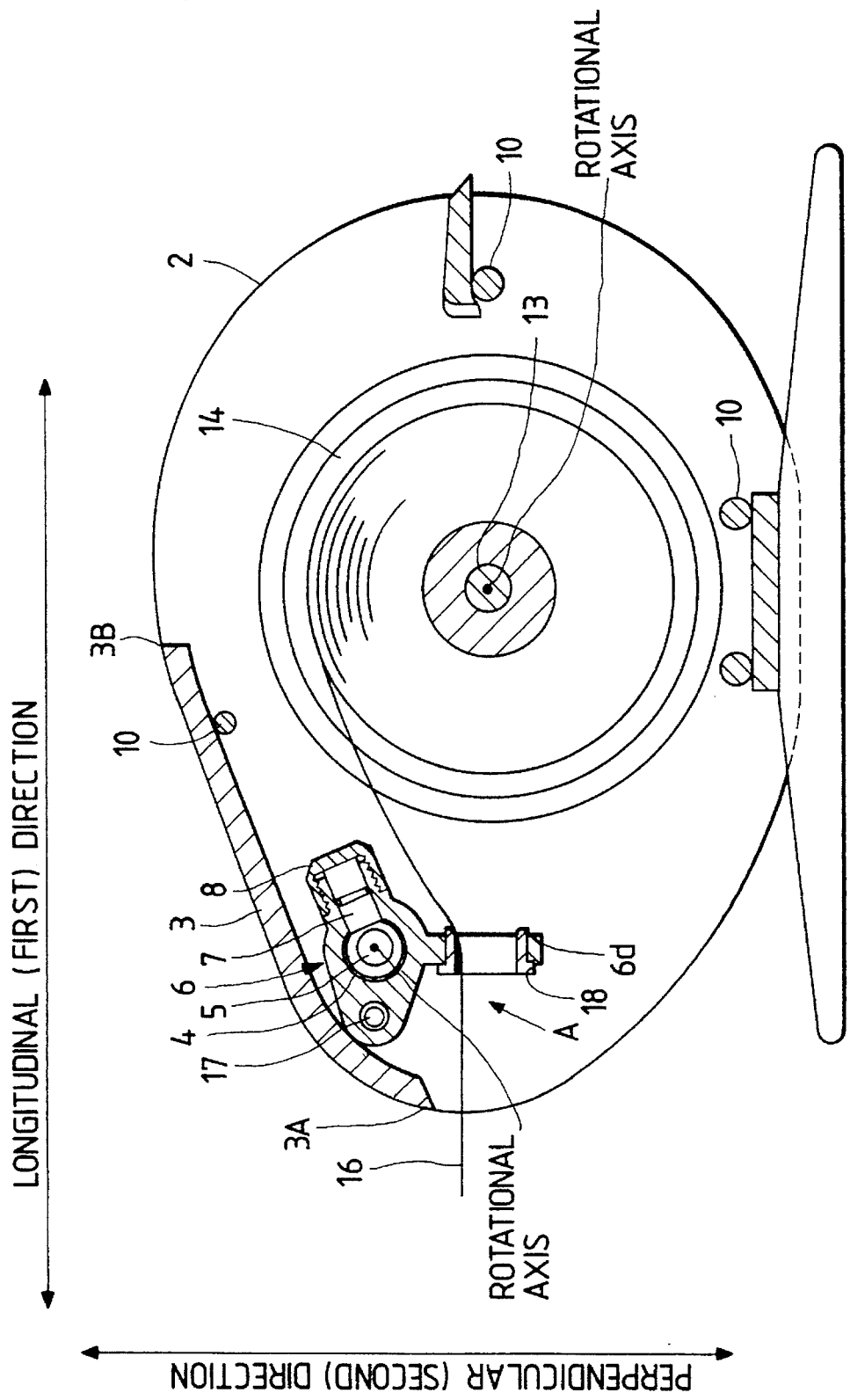
FIG. 2B is a sectional side view showing a positional relationship of the major parts of the double bearing type fishing reel taken along line II—II of FIG. 1.
Figure 3:
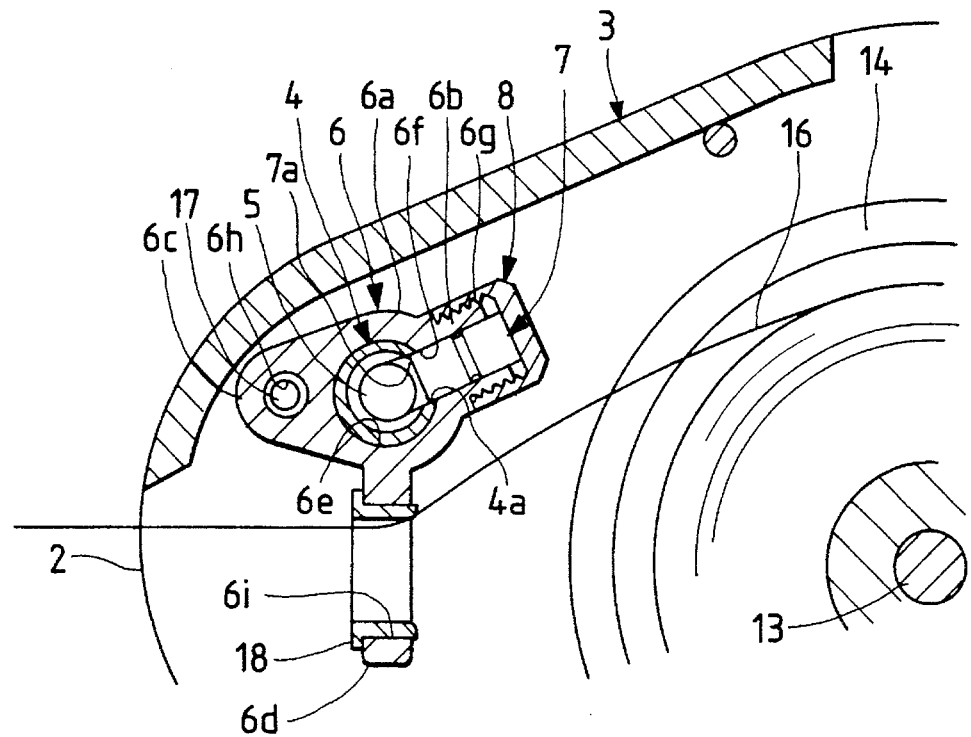
FIG. 3 is an enlarged sectional side view showing the major parts of the double bearing type fishing reel of FIG. 2.

FIGS. 1–3 show a fishing reel according to a first embodiment of the invention. In the fishing reel, left and right side frames 1 and 2 are supported in parallel relation to each other by a plurality of support columns 10. Reel side plates 11 and 12 are attached to the right and left side frames 1 and 2, respectively. A spool shaft 13 to which a spool 14 is fixed is rotatably supported by the side frames 1 and 2 through bearings not shown in the drawings. The spool shaft 13 is rotated by a handle 15 through a pinion and a drive gear (both not shown in the drawings). A fishline 16 is wound onto an outer periphery of a drum portion of the spool 14. A finger rest member 3 is provided between the side frames 1 and 2 and located relatively in front of and above the spool 14. Further, a guide cylinder 4 of a level-wind device A is non-rotatably retained between the side plate 1 and 2 and located in the vicinity of a relatively lower portion of the finger rest member 3. A guide rod 17 is provided between the side frames 1 and 2 and located in front of the guide cylinder 4.

The level-wind device A includes the guide cylinder 4, a transverse-cam shaft 5 supported by bearings (not shown) respectively fixed on both ends of the guide cylinder, a slider transversely reciprocating and sliding on an outer periphery of the guide cylinder 4 outside the transverse cam shaft 5, a pin-like engagement member 7 accommodated in the slider 6, a retainer 8 for preventing the engagement member from being removed from the slider 6, and the guide rod 17. The transverse cam shaft 5 is rotated in conjunction with the rotation of the handle 15. The guide cylinder 4 is formed with an elongated opening 4a which extends in the longitudinal direction and into which the engagement member 7 is insertable, The transverse cam shaft has cam grooves 5a with which a tip claw portion of the engagement member 7 is engaged.

As shown in FIG. 3, the slider 6 has such an outer appearance as to have a central portion 6a, a projecting portion 6b extending from the central portion 6a rearwardly and upwardly, another projecting portion 6c extending from the central portion 6a forwardly, and a line guide portion 6d extending from the central portion 6a downwardly. The central portion 6a is formed with a through-hole 6e to which the guide cylinder 4 is fittable. The projecting portion 6b is formed with a through-hole 6f having an inner diameter permitting the engagement member 7 to be inserted therein. The projecting portion 6b is further formed with a thread portion 6g with which the retainer 8 is threadingly engaged. The other projecting portion 6c is formed with a through-hole 6h into which the guide rod 17 is insertable. Also, the line guide portion 6d is formed with a through hole 6i to which a hard fishline guide ring 18 is fitted and secured. The fishline 16 wound on the spool 14 extends or projects forwardly through the hard fishline guide ring 18 provided in the line guide portion 6d.

As shown in FIG. 2B, the finger rest member 3 extends over the slider 6 and the cam shaft 5 in such a manner that a rotational axis of the cam shaft 5 is located between a front (first) end 3A of the member 3 and a rear (second) end of the member 3 in both longitudinal and perpendicular directions. Preferably, the slider 3 is located between front and rear ends 3A and 3B in the longitudinal and perpendicular directions, and in the vicinity of the finger rest member 3. Owing to this disposition of the slider 3 and the cam shaft 5, it is possible to make the reel compact in size, maintain the rotative winding performance of the level wind device, prevent the corrosion on the engagement member 7 and the cam grooves 5a, reduce the friction resistance between the hard fishline guide ring 18 and the fishline 16, and grasp the reel by user's one hand securely and stably without any concerns about the accident contact and pinch of the user's finger by the reciprocating slider 6.

The fishing reel is used in such a manner that user's one hand grasps the reel with his thumb placed on the finger rest member 3 and his other hand operated to rotate the handle 15. By this rotational input through the handle 15, the spool 14 and the transverse cam shaft 5 are rotated. The slider 6 is guided by the guide cylinder 4 and guide rod 17 and is reciprocatingly moved right and left between the side frames 1 and 2. This reciprocating movement of the slider 6 causes the fishline 16 to be wound onto spool 14 uniformly through the line guide portion 6d provided below the slider 6.

In the fishline reel thus constructed, since the engagement portion 7 provided in the slider 6 and the retainer 8 for preventing the removal of the engagement member 7 are disposed in the vicinity of the finger rest member 3 within a space defined between the inner surface of the finger rest member 3 and the fishline passing through the line guide portion 6d of the slider 6, the reel can be made compact in size. Further, since the elongated opening 4a of the guide cylinder 4 is located upwardly relative to the line guide portion 6d of the slider 6, sea water, moisture, dust or the like are prevented from entering into the elongated hole 4a even when the fishline, on which the sea water, moisture, dust or the like are adhered, is drawn on the line guide portion 6d. In other words, the sea water, moisture, dust or the like can hardly be adhered the transverse cam shaft 5, to thereby make it possible to maintain the rotative winding performance and prevent the corrosion on the engagement member 7 and the cam grooves 5a of the transverse cam shaft 5. Thus, it is possible to improve the operation of the levelwind device. Furthermore, it is possible to set the position of the fishline 16, being guided by the line-guide portion 6d projecting downwardly from the slider 6, relatively upwardly relative to the center of the spool 14 in order to reduce the friction resistance between the hard fishline guide ring 18 and the fishline 16. Moreover, since the finger rest member 3 is disposed above the slider 6, the user can grasp the reel securely and stably without any concerns about the accident that the user's finger may be contacted with or pinched by the reciprocating slider 6.

Figure 4:
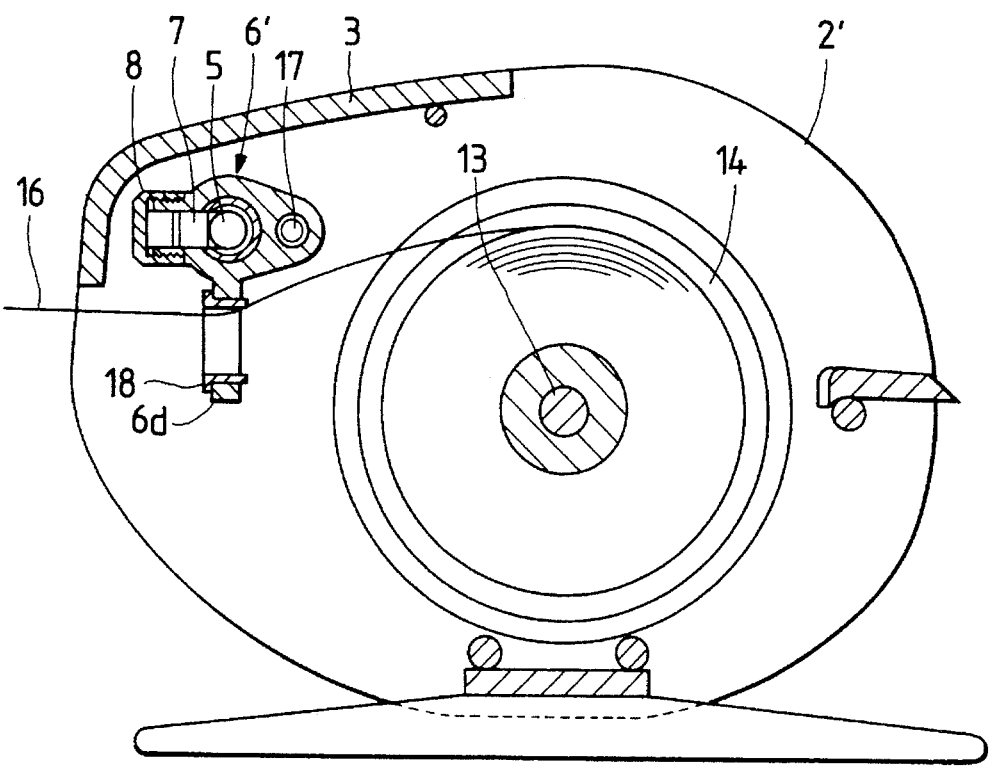
FIG. 4 is a sectional plane view showing major parts of a double bearing type reel according to a second embodiment of the present invention.
Figure 5:
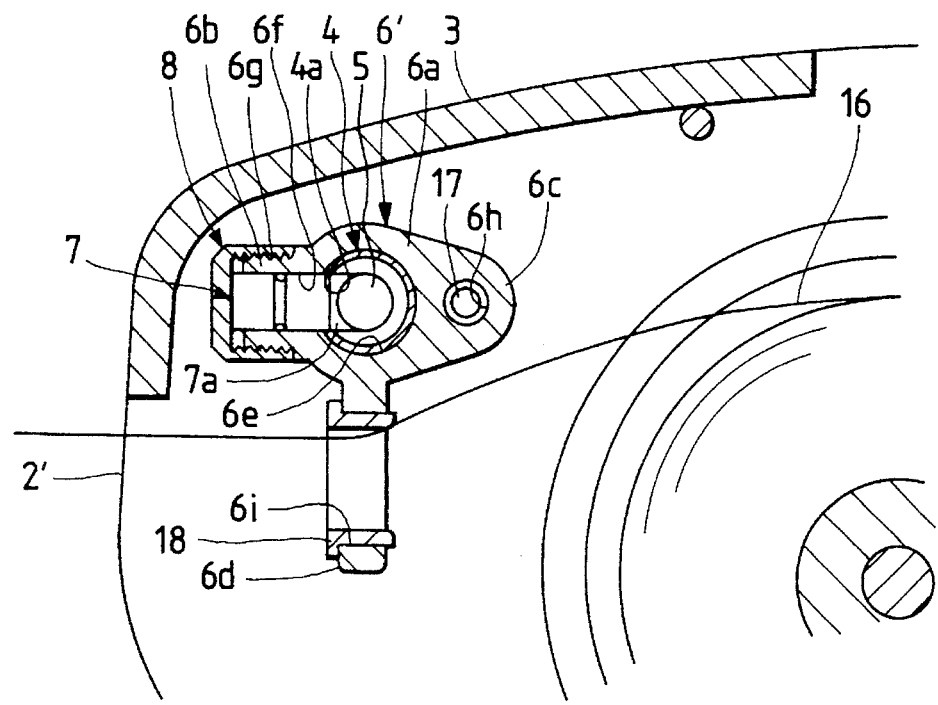
FIG. 5 is an enlarged sectional side view showing the major parts of FIG. 4.

FIGS. 4 and 5 show a fishing reel according to a second embodiment of the present invention. The second embodiment is different from the first embodiment in that the configurations of the slider and the side frames are modified, but other portions thereof are substantially the same as those of the first embodiment.

The slider 6' of the second embodiment has such as outer configuration as to include a central portion 6a, the projecting portion 6b extending from the central portion 6a horizontally and forwardly, another projecting portion 6c extending from the central portion 6a horizontally and rearwardly, and a line guide portion 6d extending from the central portion 6b downwardly. The central portion 6a is formed with a through-hole 6e to which the guide cylinder 4 is fitted. The projecting portion 6b is formed with a through-hole 6f having such an inner diameter as to permit the engagement to be inserted into the through-hole 6f. The projecting portion 6b is formed at its outer periphery with a thread portion 6g with which the retainer 8 is threadingly engaged. The projecting portion 6c is formed with a through-hole 6h into which the guide rod 17 is inserted. The line guide portion 6d is formed with a through-hole 6i to which the hard fishline guide ring 18 is secured.

Figure 6:
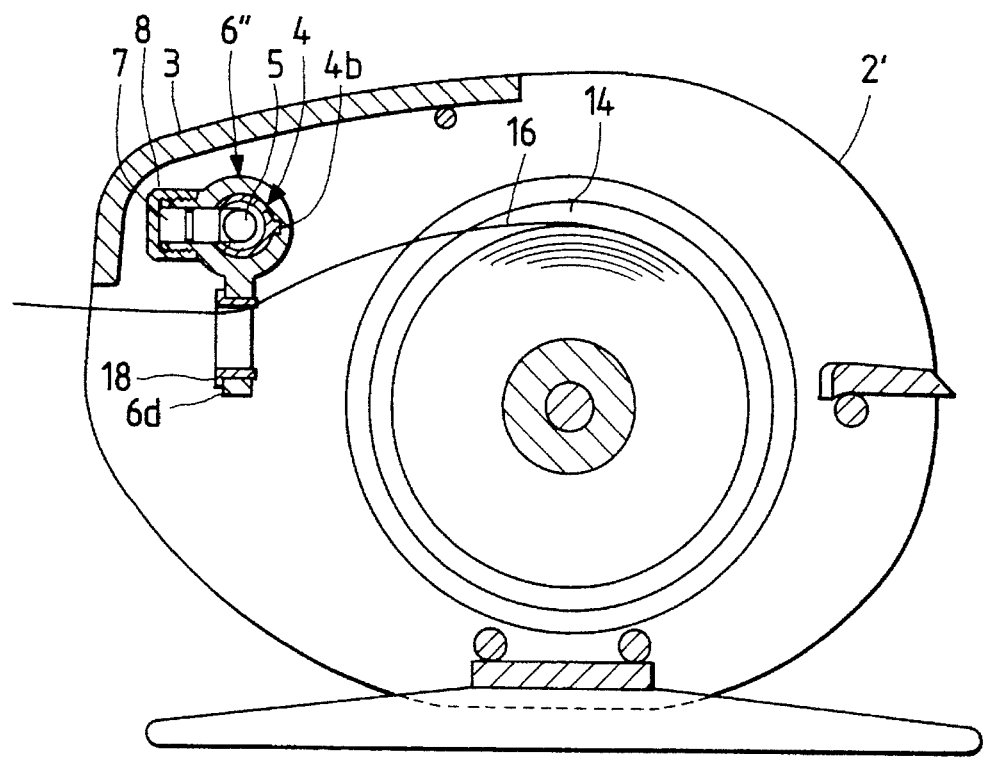
FIG. 6 is a sectional side view showing major parts of a double bearing type fishing reel according to a third embodiment of the present invention; and, FIG. 7 is an enlarged sectional side view showing the major parts of FIG. 6.
Figure 7:
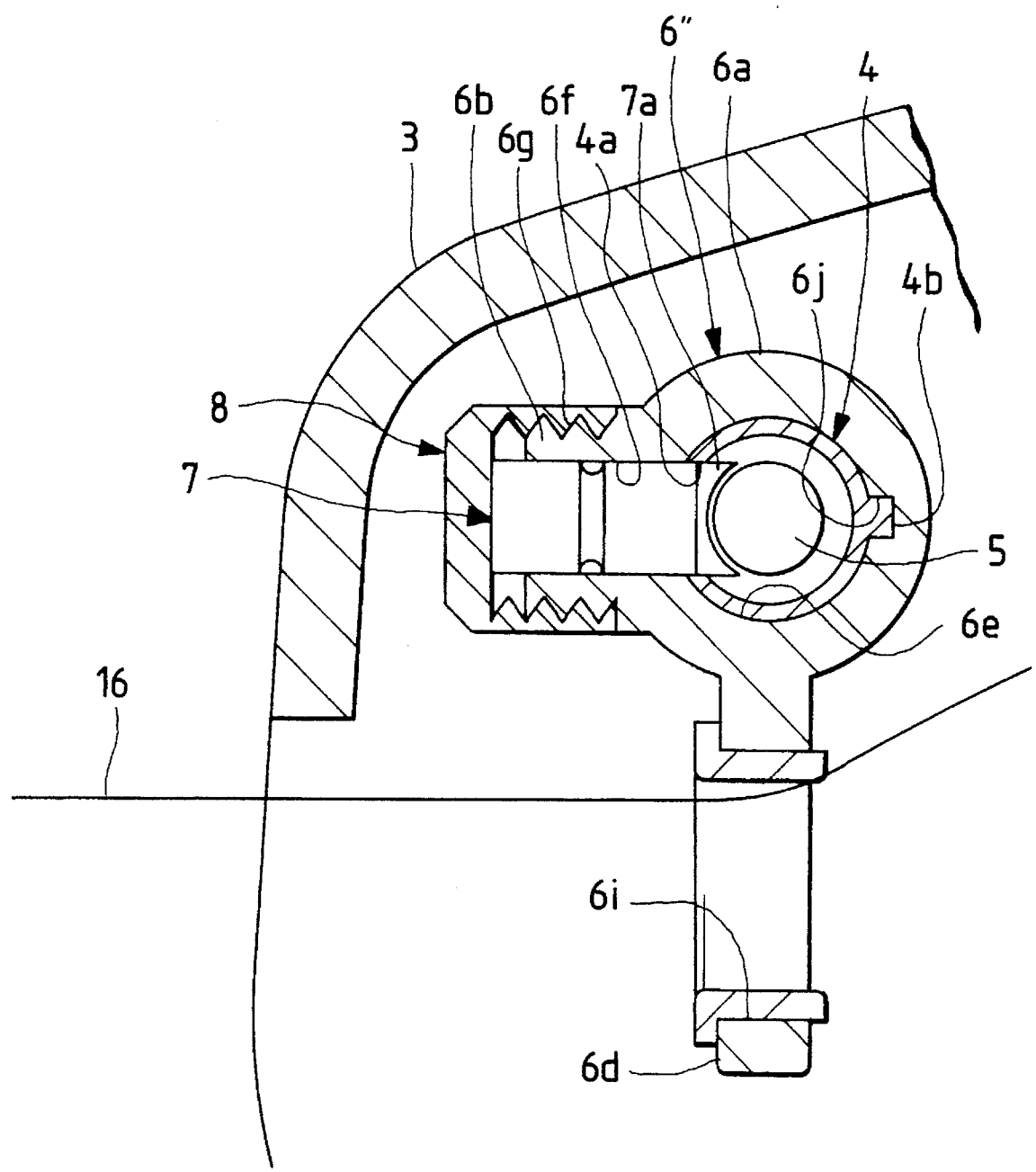

FIGS. 6 and 7 show a fishing reel according to a third embodiment of the invention.

The third embodiment is different from the second embodiment in that the slider the configuration of which is modified is guided by a projection 4b of the guide cylinder 4 so that the guide rod 17 is dispensed with, but other portions of the third embodiment is substantially the same as those of the second embodiment.

In the reel of the third embodiment, the slider 6" has the central portion 6a, the projecting portion 6b extending from the central portion 6a forwardly, and a line guide portion 6d extending from the central portion 6a downwardly. The central portion 6a is formed with a through-hole 6e to which the guide cylinder 4 is fitted. The projecting portion 6b is formed with a through-hole 6f having such an inner diameter as to permit the engagement member 7 is inserted into the projecting portion 6b. The projecting portion is further formed at its outer periphery with a thread portion 6g with which the retainer 8 is threadingly engaged. The line guide portion 6d is formed with a through-hole 6i to which a hard fishline guide ring 18 is fitted and secured. Further, the central portion 6a is formed with a recess 6j with which the projection 4b of the guide cylinder 4 is fitted. Other construction of the third embodiment is substantially the same as that of the second embodiment.

According to the present invention, it is possible to make a fishing reel compact in size. Further, since the elongated hole of the guide cylinder is located upwardly relative to the line guide portion of the slider, sea water, moisture, dust or the like are prevented from entering into the elongated hole even when the fishline on which the sea water, moisture, dust or the like are adhered is drawn on the line guide portion, that is to say, the sea water, moisture, dust or the like can hardly be adhered the transverse cam shaft, to thereby make it possible to maintain the rotative winding performance and prevent the corrosion on the engagement member and the cam grooves of the transverse cam shaft. Thus, it is possible to improve the operation of the level-wind device.

Furthermore, since the finger rest member is disposed above and over the slider, the user can grasp the reel securely and stably without any concerns about the accident that the user's finer may be contacted with or pinched by the reciprocating slider.

What is claimed is:

1. A fishing reel in which a spool is rotatably supported by a pair of side frames, said side frames defining a first direction and a second direction substantially perpendicular to said first direction in a plane orthogonal to a first rotational axis of said spool, said fishing reel comprising:

a cam shaft supported by said side frames so as to be located forwardly of said spool in said first direction and rotatable about a second rotational axis in conjunction with rotation of said spool, said cam shaft having a cam groove;

a slider movably mounted on said cam shaft and located between said side frames, said slider having an engagement follower member engageable with said cam groove, said engagement follower member being retained in a retainer which projects from said slider in a substantially horizontal direction;

a line guide portion through which a fishline extending from said spool substantially in said first direction passes, said line-guide portion extending from said slider so as to be located below said cam shaft in said second direction; and, a finger rest member located above and adjacent said slider, said finger rest member having a first end and a second end closer than said first end to said first rotational axis is located between said first and second ends in said second direction, wherein said finger rest member extends along a peripheral edge of said side frames from said first end to said second end; and, wherein said slider comprises a rotation preventing means for preventing rotational movement and maintaining a translational movement of said slider, said rotation preventing means being located at a position diametrically opposed to said engagement follower member with respect to said cam shaft.

2. The fishing reel according to claim 1, wherein said second rotational axis is disposed between said first and second ends in said first direction.

3. The fishing reel according to claim 1, wherein said engagement follower member contacts said cam groove at a position between said cam shaft and said finger rest member.

4. The fishing reel according to claim 1, wherein said finger rest member is formed with an arcuate portion which covers said slider.

5. The fishing reel according to claim 1, wherein said line-guide portion is located below said first end of said finger rest member in said second direction.

6. The fishing reel according to claim 1, wherein said rotation preventing means comprises a projecting portion formed on said slider and receiving a guide rod which extends parallel to said cam shaft, said projecting portion and said guide rod preventing rotational movement of said slider.

7. The fishing reel according to claim 1, wherein said rotation preventing means comprises a recess formed on said slider and projection extending from said cam shaft, said projection and recess preventing rotational movement of said slider.

8. A fishing reel in which a spool is rotatably supported about a first rotational axis by a pair of side frames, said side frames defining a first direction perpendicular to said first rotational axis and a second direction substantially perpendicular to said first direction and said first rotational direction, said fishing reel comprising:

a cam shaft supported by said side frames so as to be located forwardly of said spool in said first direction and rotatable about a second rotational axis in conjunction with rotation of said spool, said cam shaft having a cam groove;

a slider movably mounted on said cam shaft and located between said side frames, said slider having an engagement follower member engageable with said cam groove, and a rotation preventing means for preventing rotational movement and maintaining a translational movement of said slider, said rotation preventing means being located at a position diametrically opposed to said engagement follower member with respect to said cam shaft and extending in a substantially horizontal direction;

a line guide portion through which a fishline extending from said spool substantially in said first direction passes, said line-guide portion extending from said slider so as to be located below said cam shaft in said second direction; and a finger rest member located above and adjacent said slider, said finger rest member having a first end and a second end closer than said first end to said first rotational axis in said first direction, wherein said line-guide portion comprises a through-hole through which said fishline passes, said through-hole located substantially at the same position as said cam shaft in said first direction.

9. The fishing reel according to claim 8, wherein said second rotational axis is located between said first and second ends in said second direction.

10. The fishing reel according to claim 8, wherein said engagement follower member contacts said cam groove at a position between said cam shaft and said finger rest member.

11. The fishing reel according to claim 8, wherein said through-hole is located between said engagement follower member and said first rotational axis in said second direction.

12. The fishing reel according to claim 8, wherein said rotation preventing means comprises a projecting portion extending from said slider and receiving a guide rod which extends parallel to said cam shaft, said projecting portion and said guide rod preventing rotational movement of said slider.

13. The fishing reel according to claim 8, wherein said rotation preventing means comprises a recess formed on said slider and a projection extending from said cam shaft, said projection and recess preventing rotational movement of said slider.

14. The fishing reel according to claim 8, wherein said engagement follower member is positioned in a projecting portion which projects from slider in said first direction.

15. The fishing reel according to claim 14, wherein said projecting portion comprises an aperture having an inner diameter permitting the engagement follower member to be inserted therein.

16. The fishing reel according to claim 15, wherein said projecting portion further comprises a thread portion with which a retainer is threadingly engaged to retain said engagement follower member in said projecting portion.

* * * * *